US006681929B2

(12) United States Patent
Bergh et al.

(10) Patent No.: US 6,681,929 B2
(45) Date of Patent: *Jan. 27, 2004

(54) SLEEVE FOR HOLDING DIGITAL VIDEO DISCS AND GRAPHICS

(75) Inventors: James Allen Bergh, Boulder, CO (US); Terrence Martin Drew, Superior, CO (US)

(73) Assignee: Case Logic, Inc., Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/238,454

(22) Filed: Sep. 9, 2002

(65) Prior Publication Data

US 2003/0019773 A1 Jan. 30, 2003

Related U.S. Application Data

(63) Continuation of application No. 09/872,266, filed on Jun. 1, 2001, now Pat. No. 6,446,800, which is a continuation of application No. 09/311,678, filed on May 12, 1999, now Pat. No. 6,241,086.
(60) Provisional application No. 60/091,977, filed on Jul. 7, 1998.

(51) Int. Cl.[7] .............................................. B65D 85/30
(52) U.S. Cl. ..................... 206/308.1; 206/312; 206/232
(58) Field of Search ............................. 206/308.1, 309, 206/311, 312, 484, 232

(56) References Cited

U.S. PATENT DOCUMENTS

| 4,263,357 | A | 4/1981 | Holson |
| 4,620,630 | A | 11/1986 | Moss |
| 4,850,731 | A | 7/1989 | Youngs |
| 5,301,445 | A | 4/1994 | Hoffmeister |
| 5,396,987 | A | 3/1995 | Temple et al. |
| 5,501,326 | A | 3/1996 | Shuhsiang |
| 5,501,540 | A | 3/1996 | Ho |
| 5,588,527 | A | 12/1996 | Youngs |
| 5,588,528 | A | 12/1996 | Ozeki |
| 5,595,797 | A | 1/1997 | Miller |
| 5,692,607 | A | 12/1997 | Brosmith et al. |
| 5,715,937 | A | 2/1998 | Oshry et al. |
| 5,720,384 | A | 2/1998 | Wu-Chen |
| D391,989 | S | 3/1998 | Plutsky |
| 5,806,677 | A | 9/1998 | Storti |
| 5,882,748 | A | 3/1999 | Tomoda |
| D411,402 | S | 6/1999 | Udwin |
| 5,975,291 | A | 11/1999 | Attar et al. |
| 5,988,374 | A | 11/1999 | Funawatari et al. |
| D421,869 | S | 3/2000 | Drew et al. |
| D428,297 | S | 7/2000 | Drew et al. |
| D431,408 | S | 10/2000 | Drew et al. |
| D432,343 | S | 10/2000 | Drew et al. |
| 6,186,320 | B1 | 2/2001 | Drew |
| D441,591 | S | 5/2001 | Drew |
| 6,241,086 | B1 | 6/2001 | Bergh et al. |
| 6,267,234 | B1 | 7/2001 | Bergh et al. |
| 6,325,207 | B2 * | 12/2001 | Drew ..................... 206/308.1 |
| 6,446,800 | B2 | 9/2002 | Bergh et al. |

OTHER PUBLICATIONS

U.S. patent application Ser. No. 29/153,983, Fu, filed Jan. 2002.

U.S. patent application Ser. No. 29/167,663, Fu et al., filed Sep. 2002.

(List continued on next page.)

Primary Examiner—Shian Luong
(74) Attorney, Agent, or Firm—Sheridan Ross P.C.

(57) ABSTRACT

This invention relates to a sleeve for holding one or more digital video discs with a first dimension in a first pocket and the accompanying graphics having a second dimension in a second opposing pocket. The digital video disc is supported in the first pocket by one or more stop seals which elevate the digital video disc to a more accessible position for removal.

27 Claims, 11 Drawing Sheets

OTHER PUBLICATIONS

U.S. patent application Ser. No. 10/267,155, Fu et al., filed Oct. 2002.
U.S. patent application Ser. No. 10/011,575, Bergh et al., filed Dec. 3, 2001.
U.S. patent application Ser. No. 10/387,658, Bergh et al., filed Mar. 12, 2003.
Case Logic 1999 Catalog, p. 23.
Case Logic Spring 1999 Catalog, pp. 3, 29.
Case Logic 2000 Catalog, p. 31.
Case Logic 2001 Catalog, p. 31.
Case Logic 2002 Catalog, pp. 24, 25.

* cited by examiner

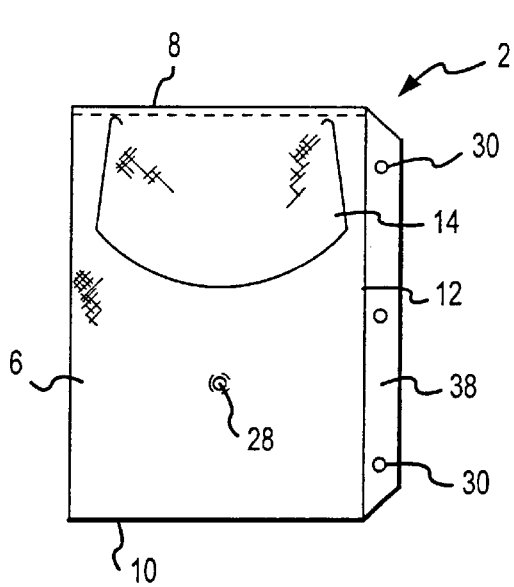
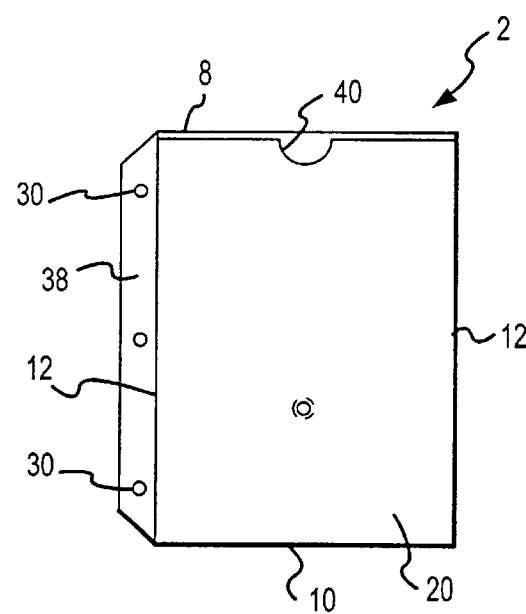
FIG.1    FIG.2
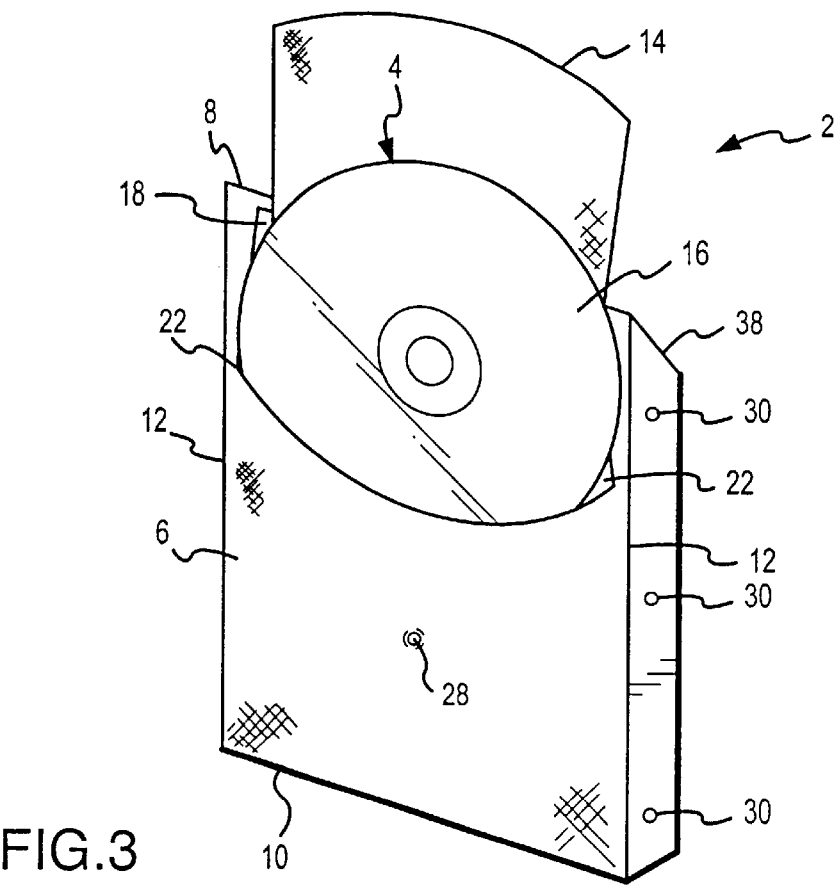
FIG.3

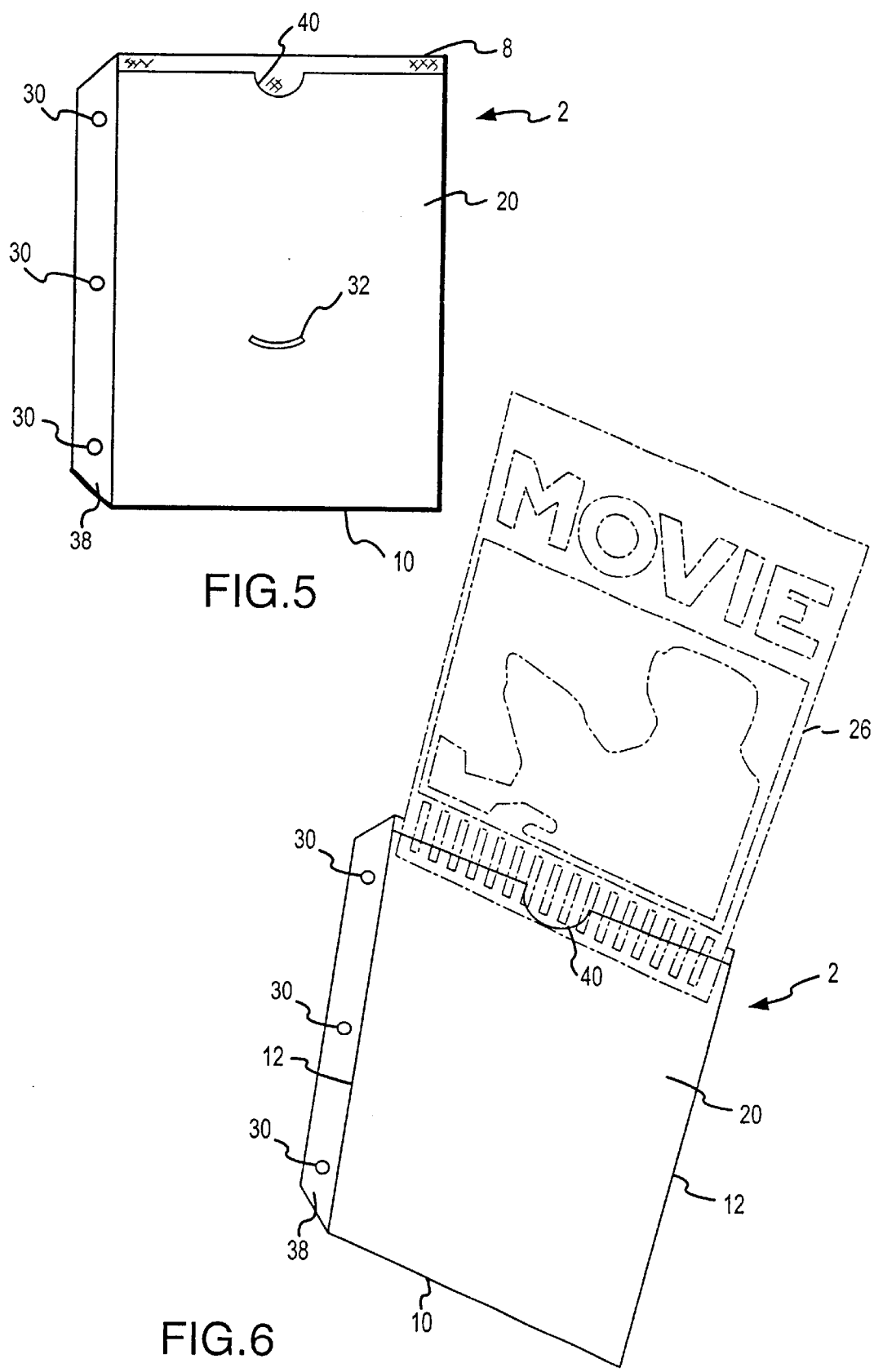

SLEEVE FOR HOLDING DIGITAL VIDEO DISCS AND GRAPHICS

This application con't of U.S. patent application Ser. No. 09/872,266, (now issued U.S. Pat. No. 6,446,800), having a filing date of Jun. 1, 2001 which con't of 09/311,678 of now issued U.S. Pat. No. 6,241,086 having a filing date of May 12, 1999 which claimed priority of U.S. Provisional Patent Application Serial No. 60/091,977, having a filing date of Jul. 7, 1998, each application being incorporated herein in their entirety by reference.

FIELD OF THE INVENTION

This invention relates to sleeves for holding recording discs, and more specifically digital video discs and their accompanying graphics.

BACKGROUND OF THE INVENTION

Compact discs, or "CD"'s as they are commonly called, carry digital information such as sound and music recordings and more recently movies and video games with accompanying sound known as Digital Video Discs (hereinafter collectively "DVDs"). The DVDs replace popular video cassettes which are typically played on video cassette recorders (VCRs), and more commonly may be played on personal computers.

DVDs are generally sold to consumers in "jewel boxes" which are rigid plastic containers which carry both the DVD and accompanying graphics which identify the particular movie, video game or program contained on the DVD. The jewel boxes are bulky, difficult to store and are not conveniently opened or closed to remove the DVD. Furthermore, the graphics sold in association with the DVDs are oversized and generally resemble the size and shape of video cassettes as apposed to the width and length of the DVD. That is, the graphics are generally much longer than the DVD and additionally slightly wider. Thus, storing the DVD in a form of flexible, lightweight storage sleeve and the corresponding graphics in a sleeve with equal sized pockets is problematic.

Although lightweight, flexible storage sleeves which are designed specifically for CD's are known in the art, these devices are not designed to hold the larger graphics sold in association with DVDS. Further, if a sleeve is manufactured which is compatible in length and width for the DVD graphics, the DVD pocket which is designed for holding the DVD will generally be oversized and not overly useful.

Thus, a lightweight, flexible storage sleeve for storing DVDs is needed which can additionally store the oversized graphics associated with the DVD in a similarly sized pocket. Further, the manufacturing of the DVD sleeve must be consistent with generally recognized sleeve manufacturing processes to maintain the low cost benefits associated with flexible storage sleeves as opposed to rigid plastic jewel boxes.

SUMMARY OF THE INVENTION

It is thus an object of the present invention to provide a lightweight, flexible sleeve to store DVDs and the accompanying oversized graphics in pockets with substantially similar widths. Thus, in one embodiment of the present invention a sleeve is provided which is comprised of a front layer, an intermediate middle layer and a back layer. A pocket is provided between the front layer and middle layer for receiving a DVD while a second pocket is provided between the middle layer and back layer to receive the graphics.

It is a further aspect of the present invention to provide a cost effective, non-woven material which is in contact with the DVD which prevents scratching, does not accumulate grit or other particles and which is firm enough not to require a backing sheet for support. In one aspect of the present invention a non-woven material known as "Veratec®" is provided to serve this purpose.

It is another aspect of the present invention to provide a DVD and accompanying graphics storage sleeve which has a storage pocket for the DVD and which has a "DVD stop seal" which allows the DVD to be stored at an elevated height, thus permitting the top edge of the DVD to be near the access opening of the DVD storage pocket for easy access. The stop seal prevents the DVD from falling into the DVD storage pocket and inhibiting removal.

In one embodiment of the present invention, the stop seal is provided by utilizing a back sheet with a back sheet aperture in conjunction with a conventional manufacturing process to minimize expenses during manufacturing. Alternatively, the sleeve with a stop seal may be manufactured without utilizing a back sheet aperture.

In another aspect of the present invention, the same technology which provides the DVD stop seal in the DVD storage pocket is utilized to provide one or more "frictional nubs" to be provided in the DVD storage pocket. The "frictional nubs" prevent the DVD from falling out of the DVD storage pocket when the sleeve is turned upside down. For example, in one embodiment of the present invention the DVD storage pocket may utilize a top layer which is approximately the length of the DVD and which has a "thumb cut" or notch to allow access to the aperture of the DVD with a user's fingers or thumb. in this embodiment, there is no flap which overlays the DVD. Since the storage pocket has a diameter which is slightly larger than the DVD (as a result of the oversized graphics pocket), the DVD falls from the pocket when the sleeve is turned upside down.

To alleviate this problem, the frictional nubs engage the side edges of the DVD and prevent the DVD from inadvertently falling out of the DVD pocket. In one embodiment of the present invention the frictional nubs are provided by the sealing of the front sheet and middle sheet at one or more predetermined locations to create a DVD pocket diameter which is slightly larger than the diameter of the DVD yet provides sufficient frictional resistance to prevent the DVD from inadvertently falling out. The frictional nubs may be provided during an ultrasonic or RF welding process by providing one or more apertures in the back sheet which allow the ultrasonic welding to occur at a predetermined location without welding any other portion of the front, middle or back sheet. Alternatively, the frictional nubs may be provided without utilizing back sheet apertures by utilizing a two stage manufacturing technique which first welds the front sheet and middle sheet together while creating the frictional nubs. The back sheet is then welded in a second stage to the front and middle sheets to complete the DVD sleeve.

It is another aspect of the present invention to provide a manufacturing process for producing a sleeve design for DVDs and accompanying graphics which utilizes a "cutout" portion in the back sheet to provide either the DVD stop seal or frictional nubs on the front sheet as discussed above. Thus, in one aspect of the present invention a "cutout" or aperture in the back sheet is utilized in combination with a sheet bonding process to interconnect the front sheet and middle sheet at preselected positions to either provide a DVD stop seal in one sleeve design or one or more frictional nubs in another embodiment of the invention. Alternatively, a manufacturing process is provided which does not utilize or require a back sheet aperture to create either the DVD stop seal on the functional nubs.

In another aspect of the present invention, a "write-on" title strip is provided either along the upper edge or lateral edge of the DVD sleeve which is made of a material which permits the recordation of information related to the stored DVD either in pen, ink, or pencil.

BRIEF DESCRIPTION OF THE DRAWINGS

FIG. 1, is a front elevation view of a DVD storage sleeve with protective flap and a binding strip adapted for inserting the storage sleeve into a 3-ring binder and including a circular shaped DVD stop seal;

FIG. 2 is a rear elevation view of the DVD storage sleeve shown in FIG. 1;

FIG. 3 is a front perspective view of the DVD storage sleeve of FIG. 1 shown with a DVD partially inserted in the DVD pocket;

FIG. 5 is a rear elevation view of the DVD storage sleeve shown in FIG. 1, and showing an alternative embodiment of the back sheet "cut-out" aperture;

FIG. 6 is a rear perspective view of an alternative embodiment of the DVD storage sleeve, shown without a back sheet aperture and with a graphics sheet partially inserted in the graphics storage pocket;

DETAILED DESCRIPTION OF THE PREFERRED EMBODIMENT

Figure 4:
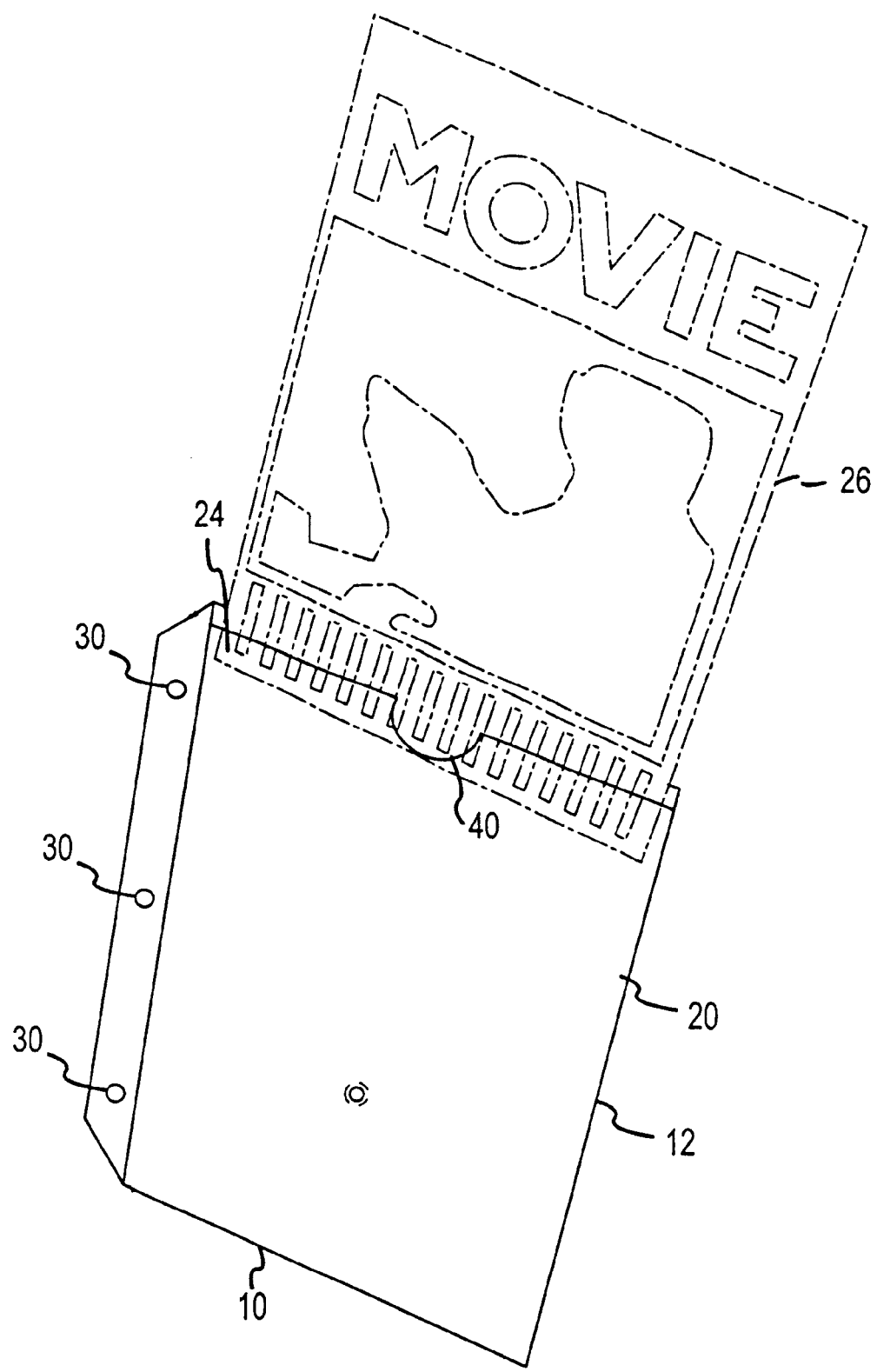
FIG. 4 is a rear perspective view of the DVD storage sleeve shown in FIG. 1 with the graphics sheet partially inserted into the graphics storage pocket.
Figure 7:
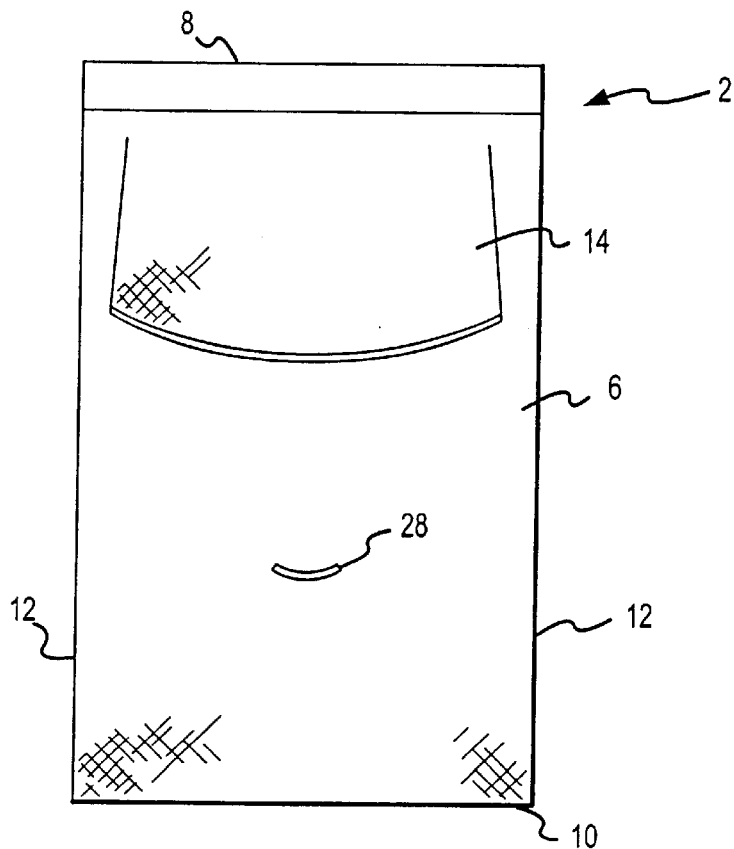
FIG. 7 is a front elevation view of an alternative embodiment of the invention shown in FIG. 1 with a title strip positioned proximate the upper edge of the DVD graphics pocket and the elimination of the binding strip.
Figure 8:
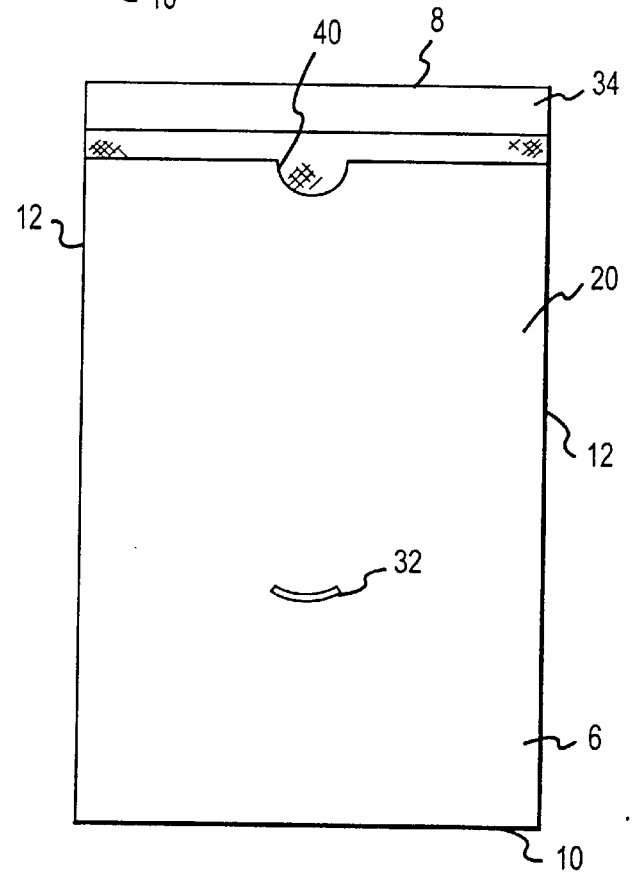
FIG. 8 is a rear elevation view of the sleeve shown in FIG. 7 and further identifying the write-on title strip.

Referring now to the drawings, FIG. 1 is a front elevation view of a first embodiment of the present invention. More specifically, the drawing shows a front elevation view of a DVD storage sleeve 2 capable of holding one DVD disc 4 and the associated graphics 26.

The DVD sleeve 2 is generally comprised of a front or top sheet 6, a middle sheet 18 and a back sheet 20. A DVD pocket 22 or sleeve capable of holding a DVD is formed between the front sheet 6 and middle sheet 18 while a second graphics pocket 24 or sleeve is formed between the middle sheet 18 and back sheet 20 for holding the graphics 22 associated with the DVD FIG. 2 depicts a rear elevation view of the embodiment shown in FIG. 1.

In one aspect of the present invention, both the front sheet 6 and middle sheet 18 are comprised of a spun-bonded, non-woven material to prevent scratching of the DVD. In an alternative embodiment, a non-woven material such as Veratece is provided. Alternatively, woven materials or other non-woven materials such as Sontara® can be used with or without any type of reinforced backing sheet made of polypropylene or other similar materials. The back sheet 20 is preferably a transparent polypropylene material which enables the user to clearly see the graphics positioned in the graphics storage pocket. Alternatively, any other type of transparent material may be used as appreciated by one skilled in the art. Various embodiments of the present invention sleeve design which have a configuration for storing two DVD's and not the accompanying graphics would preferably use non-woven materials for the front sheet 6, middle sheet 18 and back sheet 20.

Since the DVD graphics 26 are both slightly wider and substantially longer than the diameter of the DVD 4 which is stored in the opposing DVD storage pocket, modifications must be made to the DVD storage pocket to facilitate access to the DVD 4 and/or prevent the DVD from falling out of the storage sleeve if the sleeve is inverted. In the embodiments shown in FIGS. 1–10, a flap 14 is provided in the front sheet to cover the DVD to prevent dust and other foreign materials from entering the pocket. Further, the flap prevents the DVD from falling out of the pocket inadvertently if the sleeve is inverted. In one embodiment, the flap has an arcuate shape at the point of termination to resist tearing when the flap is repeatedly opened and closed.

Since the DVD 4 has a diameter (and hence length) which is significantly less than the DVD graphics sheet 26, the overall DVD pocket 22 length must be substantially reduced to prevent the DVD 4 from falling into the pocket an excessive distance. Thus, a DVD "stop seal" 28 is provided and positioned approximately the diameter of a DVD down the length of the DVD pocket 22 from the sleeve upper edge 8 to hold the DVD 4 at an elevation which allows removal of the DVD 4 when the flap 14 is lifted upward. Preferably the DVD stop seal 28 is positioned at a location which places a top edge of the DVD near the hinge position of the flap 14.

The DVD stop seal 28 is created by interconnecting the flexible front sheet 6 to the middle sheet 18 at a predetermined location, yet not interconnecting the middle sheet 18 to the flexible back sheet 20 and hence reducing the size of the graphics pocket 24. The interconnection may be accomplished by individually sewing, heat bonding or otherwise interconnecting the front sheet 6 and middle sheet 18 prior to interconnecting the back layer. Preferably, the front sheet 6 is first interconnected to the middle sheet 18 by welding or other similar technique while the DVD stop seal 28 or frictional nubs 36 are additionally created by interconnecting the front sheet 6 and middle sheet 18 at predetermined locations. The back sheet is then interconnected to the middle sheet 18 by welding or other similar means to complete the DVD sleeve in the two stage manufacturing process.

Alternatively, to enable the DVD stop seal 28 to be created during conventional manufacturing processes where the front sheet 6, middle sheet 18 and back sheet 20 are simultaneously welded together, a back sheet "cutout" aperture 32 may be provided in the transparent polypropylene back sheet 20 prior to welding. Thus, as seen in FIG. 2, a circular cutout portion is provided in the polypropylene back sheet 20 which allows the front sheet 6 and middle sheets 18 to be bonded together at a position just below where the DVD rests in the DVD pocket 22. The DVD stop seal 28 thus prevents the DVD 4 from sliding downward into the DVD pocket 22 to a position which is difficult to access from the pocket opening proximate the flap 14.

Although in the embodiment shown in FIG. 1 and FIG. 2 the back sheet cut-out aperture 32 and corresponding DVD stop seal 28 are circular in shape, as appreciated by one skilled in the art the geometric shape and size of both the cutout aperture 32 and DVD stop seal 28 can be any variety of sizes and shape. For example, it is possible to use straight lines, arcuate lines, triangular or rectangular shapes or more than one cutout and DVD stop seal 28 as long as the cutout aperture 32 and corresponding DVD stop seal 28 serve the purpose of interconnecting the front sheet 6 and middle sheet 18 at a position which prevents the DVD from falling downward into the DVD pocket 22.

For example, in FIGS. 5–8, an arcuate shaped cut-out aperture 32 and/or stop seal 28 is utilized as opposed to the circular cut-out aperture 32 and stop seal 28 shown in FIGS. 1–4. As discussed in greater detail below, FIG. 6 depicts a DVD sleeve which utilizes a DVD stop seal 28, but is manufactured utilizing a procedure which does not require a back sheet aperture 32.

Referring now to FIGS. 3–4, front and rear perspective views of the DVD storage sleeve 2 are shown with a DVD 4 being shown partially inserted into the DVD pocket 22 in FIG. 3 while FIG. 4 depicts the graphics sheet 26 being partially inserted into the graphics' storage pocket 24. As shown in FIGS. 1–4, the DVD storage sleeve 2 in one embodiment is designed to be inserted into a 3-ring binder such as a notebook for storage purposes. This is accomplished by providing a binding strip 38 positioned proximate to one of the lateral edges 12 of the DVD and graphics storage pocket and including one or more binding apertures 30 to allow insertion into a binding device.

Furthermore, as seen in FIG. 6, a rear perspective view of the DVD sleeve 2 is shown without the back sheet aperture 32, yet still utilizing a DVD stop seal 28 when the front sheet 6 and middle sheet 18 are interconnected. This is accomplished by utilizing a two stage manufacturing process which first welds the front sheet 6 and middle sheet 18 along the bottom edge, lateral edges and possibly the upper edge. Simultaneously, the DVD stop seal 28 on the functional nubs 36 are creating by welding the front sheet 6 and middle sheet 18 at predetermined locations to support or functionally engage the DVD. The back sheet 20 is then interconnected by welding or other similar means to the front and middle sheets along at least the lateral edge and bottom edge to complete the DVD sleeve manufacturing process.

Referring now to FIGS. 7–11, an alternative embodiment of the invention shown in FIG. 1 is provided with the binding strip 38 removed on the lateral edge of the DVD sleeve. Thus, in this embodiment the DVD sleeve cannot be used in conjunction with a 3-ring binder, but rather the DVD sleeve 2 is used in association with a tray or other similar device which allows a multiplicity of DVD sleeves 2 to be stored upright until use.

Figure 9:
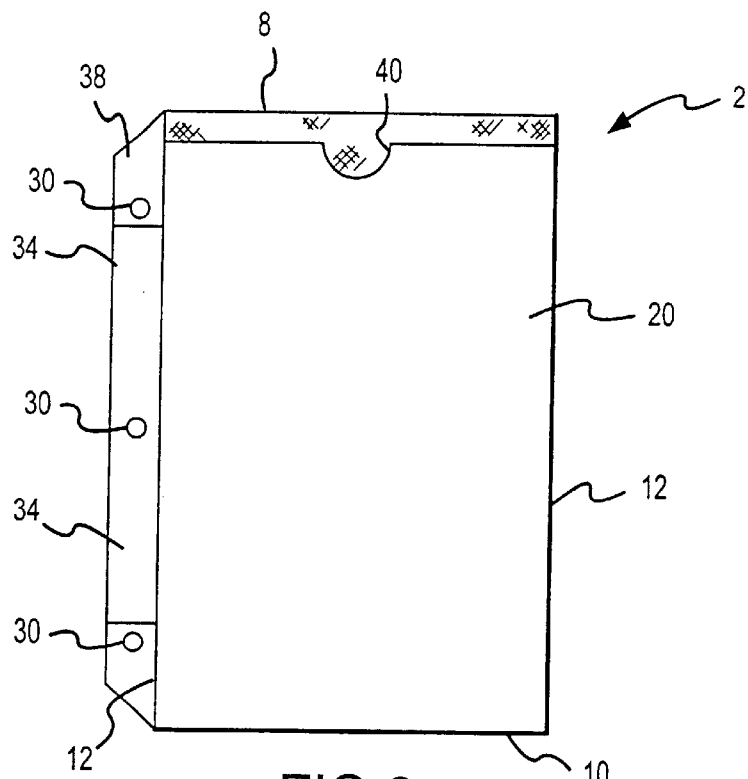
FIG. 9 is a rear elevation view of a DVD storage sleeve with binding strip for interconnection to a 3-ring notebook and including a write-on title strip positioned on the binding strip.
Figure 10:
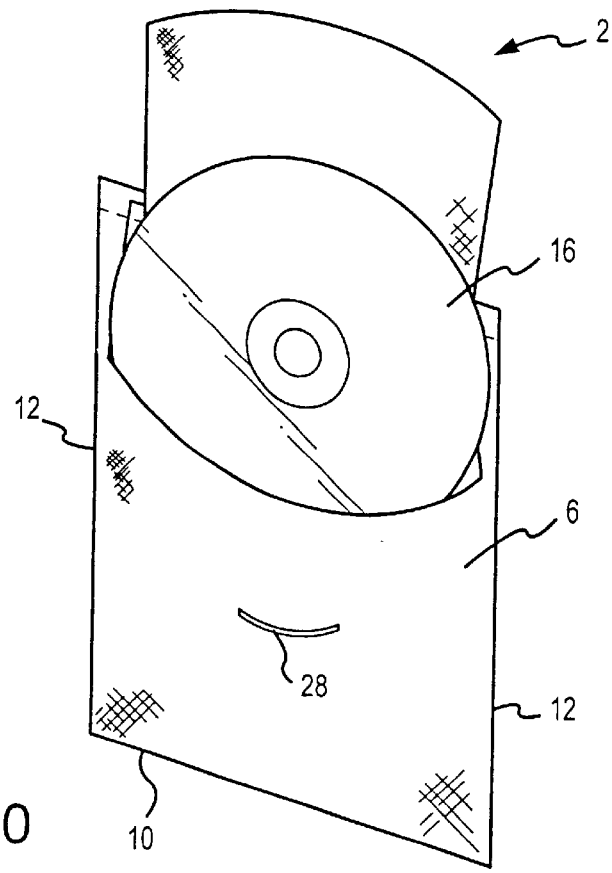
FIG. 10 is a front perspective view of the sleeve shown in FIG. 7 with a DVD partially inserted in the DVD storage pocket.

As further identified in FIGS. 7–11, in an alternative embodiment of the present invention, a title strip 34 is provided and positioned proximate to the upper edge 8 of the graphics or DVD storage pocket. The title strip 34 is comprised of any type of material which allows the recordation of information related to the DVD or graphics, such as polypropylene, vinyl, or a non-woven material with a white finish. Preferably the information can be written in pen ink, pencil, or magic marker and more preferably can be erased if necessary. Alternatively as shown in FIG. 9, the title strip maybe provided proximate a lateral edge 12 of the DVD sleeve 2, either in conjunction with a binding strip 38 and aperture 30 or independently without the aperture 30 associated with a binding strip 38. FIG. 10 depicts a front perspective view of a DVD sleeve 2 with a DVD 4 partially inserted into the DVD storage pocket 22 and additionally identifying the DVD stop seal 28.

Figures 11, 12:
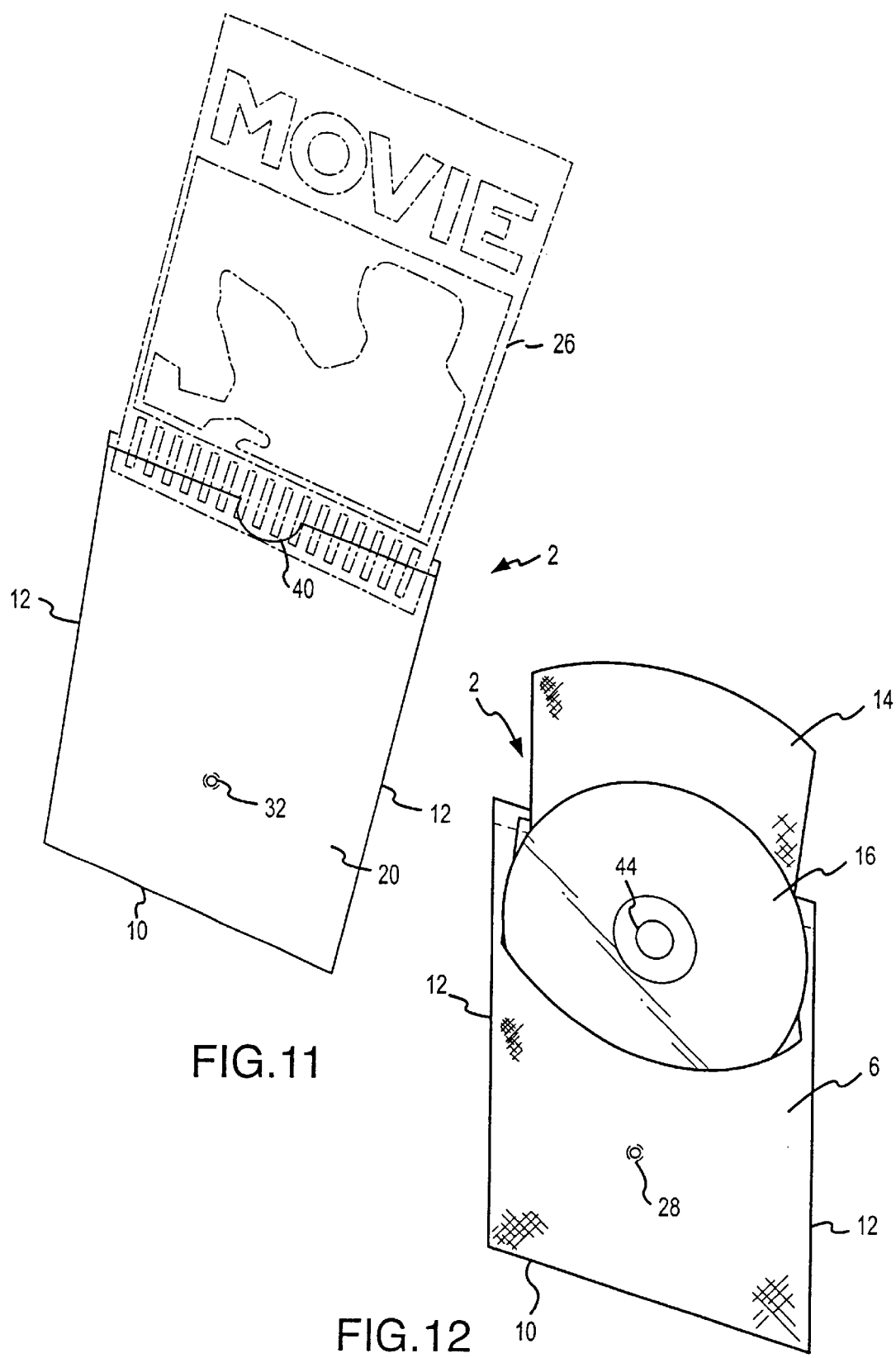
FIG. 11 is a rear perspective view of a DVD sleeve shown with a graphics sheet partially inserted in the graphics storage pocket and showing an alternative circular shaped back sheet aperture.
FIG. 12 is a front perspective view of the sleeve shown in FIG. 11 and showing a circular shaped disc stopping seal.

FIG. 11 is a rear perspective view of a DVD sleeve 2 shown with a graphics sheet 26 partially inserted into the graphics pocket 24. In this figure, a substantially round back sheet aperture 32 is utilized. FIG. 12 is a front perspective view of the DVD sleeve shown in FIG. 11.

Figure 13:
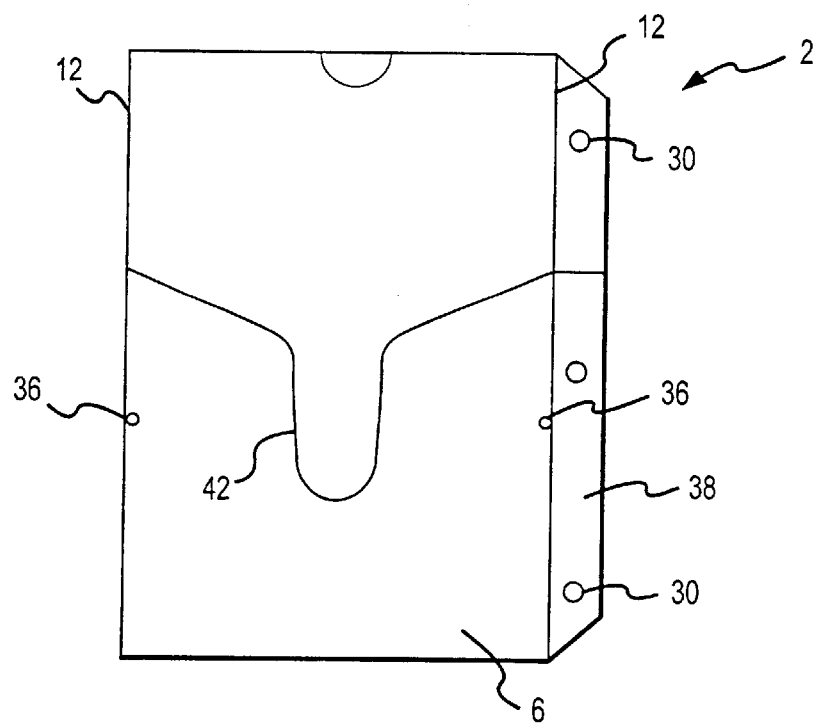
FIG. 13 is a front elevation view of an alternative DVD sleeve design which utilizes a thumb cut as opposed to a flap and showing two frictional nubs positioned proximate to the lateral edges of the DVD pocket.
Figure 14:
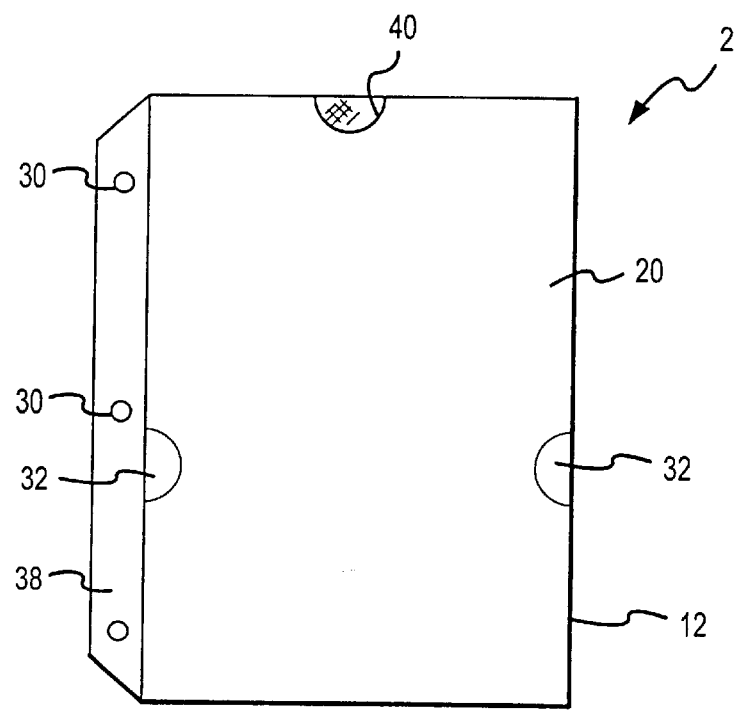
FIG. 14 is a rear elevation view of the sleeve shown in FIG. 13.

Referring now to FIGS. 13 and 14, an alternative embodiment of the present invention is shown which does not utilize a flap 14 positioned on the front sheet 6 to hold the DVD in place. In this embodiment, the front sheet 6 utilizes a "u" shaped thumb cut 42 which extends downwardly to permit the user of the sleeve 2 to access the aperture 44 of the DVD for removal. In this embodiment, the sleeve 2 does not require a DVD stop seal 28 since the DVD pocket 22 is substantially the same length as the diameter of the DVD. However, without the flap embodiment shown in FIG. 1, it would be possible for the DVD 4 to inadvertently fall from the DVD pocket if the sleeve 2 is inverted. This is due to the fact the DVD pocket 22 is slightly larger than the DVD since the graphics pocket 24 required for the accompanying graphics 26 on the reverse side must be wider to hold the slightly larger graphics.

To alleviate the problem of the DVD inadvertently falling from the DVD pocket 22, frictional "nubs" 36 are provided as shown in FIG. 13 to effectively reduce the diameter of the DVD pocket 22 and to engage the DVD 2 in such a manner as to prevent the DVD 2 from inadvertently falling out of the DVD 22 pocket when the DVD sleeve 2 is inverted.

To provide the frictional nubs 36, in one embodiment back sheet "cutouts" or apertures 32 are provided in the back sheet 20 at the location immediately opposite the position on the flexible front sheet 6 and middle sheet 18 where the frictional nubs 36 are desired. The front, middle, and back sheets may then be ultrasonically welded along the top edge, bottom edge and lateral edges simultaneously during a bonding process while the middle sheet 18 and front sheet 6 are additionally bonded at the location of the frictional nubs 36. Similar to the DVD stop seals 28 previously discussed, any number of geometric configurations and/or number of frictional nubs 36 may be utilized to achieve the function of effectively reducing the internal diameter of the DVD pocket 22 to such a degree that the DVD 2 will not fall from the DVD pocket 22 when the DVD sleeve 2 is turned upside down.

Alternatively, and as previously discussed, it is possible to create the frictional nubs 36 without utilizing a back sheet aperture 32 by utilizing a different two stage manufacturing process which first welds the front sheet 6 and middle sheet 18 while making the necessary welds for the frictional nubs 36. The back sheet 20 is then interconnected to the first sheet 6 and middle sheet 18 by welding or interconnection method which is commonly known in the art.

As shown in FIGS. 13 and 14, in one embodiment of the present invention two frictional nubs 36 are provided at a position adjacent the lateral edges 12 of the DVD pocket 2 proximate to a location which is adjacent the widest portion of the DVD 2 when it rests in the DVD pocket. As the DVD 2 is inserted into the DVD pocket 22, the DVD 4 engages the frictional nubs 36 and is substantially prevented from falling from the DVD pocket 22 even when the DVD sleeve 2 is inverted. For removal during normal use a user merely applies a slight finger pulling force while holding onto the DVD aperture 44 or edge.

Figure 15:
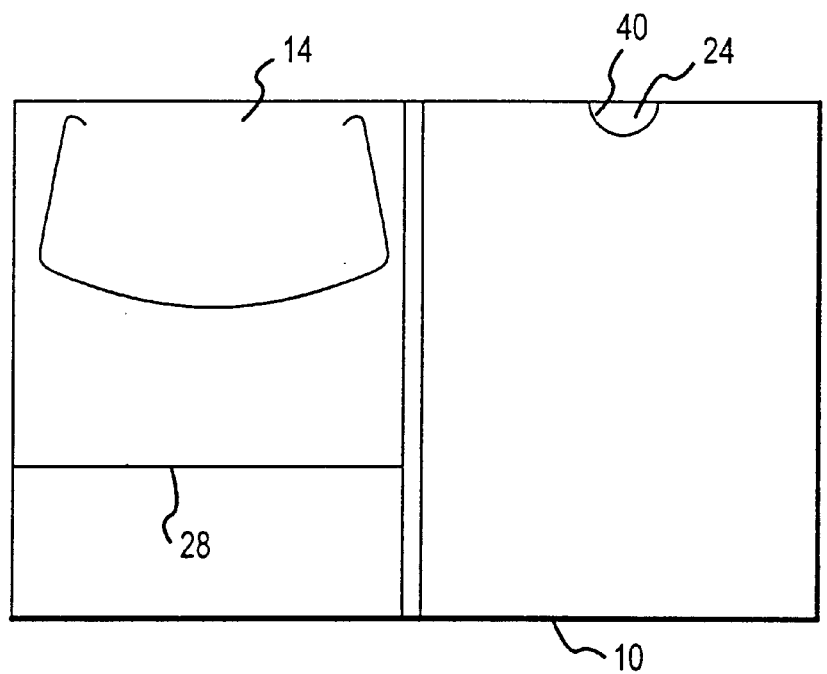
FIG. 15 is a front elevation view of an alternative embodiment of the present invention showing a foldable sleeve capable of holding two DVDs and the accompanying graphics.
Figure 16:
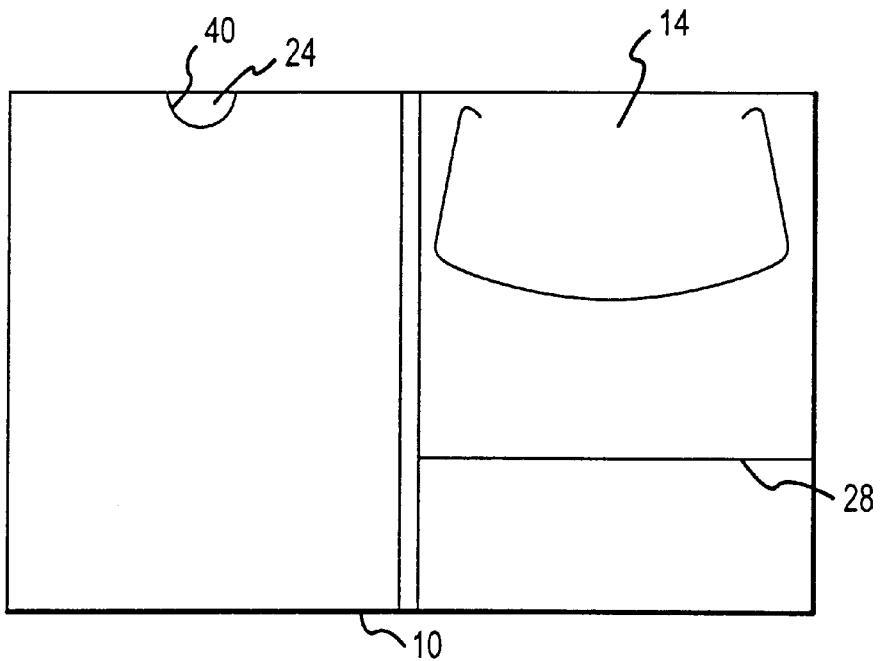
FIG. 16 is a rear elevation view of the sleeve design shown in FIG. 13.

Referring now to FIGS. 15–16, a front and back view of an alternative embodiment of the present invention is shown with dual capacity DVD storage sleeves and dual capacity graphics storage pockets 24 for storing the accompanying graphics. As shown in the front elevation view of FIG. 13, a DVD storage pocket 22 with flap 14 is shown on the left side of a foldable sleeve, while a graphics storage pocket 24 is shown on the right side. As shown on the rear elevation view of FIG. 13, a mirror image of the front view is shown with a second DVD storage pocket positioned immediately behind the first DVD storage pocket 22 and a second graphics storage pocket 24 positioned immediately behind the first graphics storage pocket 24. In an alternative embodiment of the present design in FIGS. 13–14, the flap design shown may be replaced with a "u" shaped thumb cut as shown in the sleeve in FIGS. 11–12.

As seen in both the front and rear elevation views of FIGS. 15–16, both of the DVD storage pockets have a common DVD stop seal 28 to prevent the DVDs from falling into the pocket and thus becoming substantially inaccessible to the user. This design implementing dual DVDs storage pockets positioned immediately opposite one another also allows the dual capacity sleeve to be manufactured without requiring a "cutout" aperture 32 on the back sheet to provide a DVD stop seal 28 as previously discussed in various embodiments above.

In the embodiment shown in FIGS. 13–14, both the front sheet 6 and back sheet 20 of the graphics storage pocket 24 are comprised of a transparent material such as polypropylene to permit viewing of both graphics sheets. Preferably the front sheet 6 and back sheets 20 utilized for the DVD storage pockets 22 and the middle sheets 18 are comprised of a non-woven material to prevent any scratching of the DVDs 4. Of course any combination of materials known in the art could be used to accomplish the same purpose of providing a flexible sleeve for the storage of DVDs and the graphics.

Figure 17:
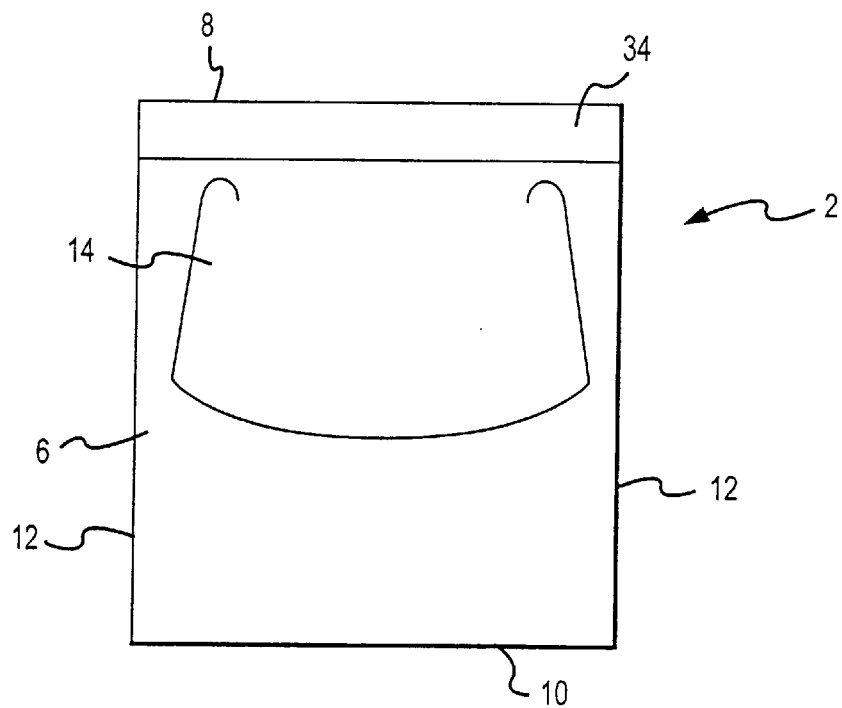
FIG. 17 is a front elevation view of an alternative sleeve design with a write-on title strip which is capable of holding either one or two DVDS.
Figure 18:
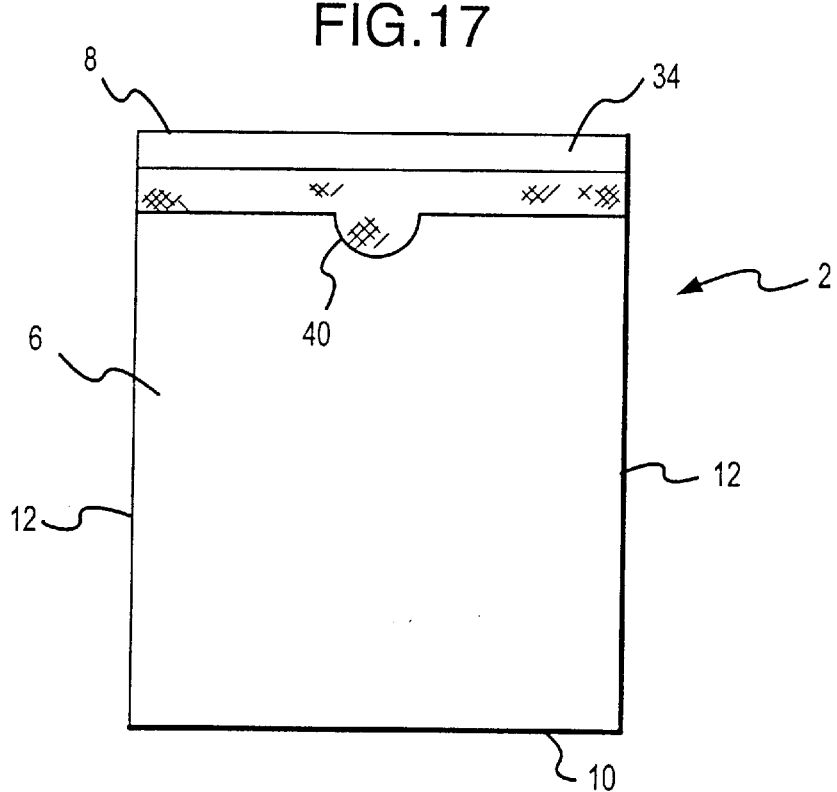
FIG. 18 is a rear elevation view of one embodiment of the sleeve shown in FIG. 17 and adapted for holding a graphics page.

Referring now to the front elevation view shown in FIG. 17, an alternative embodiment of the present invention is provided which allows the storage of two DVDs 4, yet does not provide storage for the accompanying graphics. Further, a write-on title strip 34 is provided along an upper edge of the DVD pocket 22 and flap. Alternatively, the back sheet 20 may be transparent to facilitate the storage of graphics associated with the DVD.

In another aspect of the present invention a process is provided for manufacturing the DVD sleeves shown in FIGS. 1–12 that utilize either a DVD stop seal 28 or frictional nubs 36. This process is initiated by providing the front sheet 6, middle sheet 18 and back sheets 20 on continuous rolls of the respective materials. The individual sheets of material with a predetermined width are then rolled out and the respective "cutouts" made to each sheet. For example, in the embodiment shown in FIG. 1, the top layer has a flap cut, while the back layer has a cutout made for the graphics thumb cut (at top of sheet) and a circular DVD pocket cutout which corresponds to the location of the DVD stop seal 28. There are no cutouts necessary on the middle layer.

After the cutouts are made to the respective front and back sheets, the individual layers of material are all fed back together and aligned, at which time all of the weld seals of the three layers are made simultaneously. These welds include the seals required on the peripheral edges to form the pockets as well as the DVD stop seals 28 or frictional nubs 36 as the case may be. Once all of the welds have been made the continuous roll of sealed material is cut as appropriate to create the individual DVD sleeve 2. Although the process generally described utilizes ultrasonic welding to form the necessary seals, as appreciated by one skilled in the art RF (radio frequency) welding or other forms of interconnection can be implemented to create seals between various layers of now-woven or transparent type materials such as polypropylene.

Alternatively, in a method to provide the DVD stop seals 28 on frictional nubs 36 without utilizing a back sheet aperture 32, a two stage manufacturing process is utilized which first interconnects the front sheet 6 to the middle sheet 18 while additionally creating the DVD stop seal 28 or frictional nubs 36. The back sheet 20 is then interconnected to the middle sheet 18 and front sheet 6 to complete the DVD sleeve 2.

Figure 19:
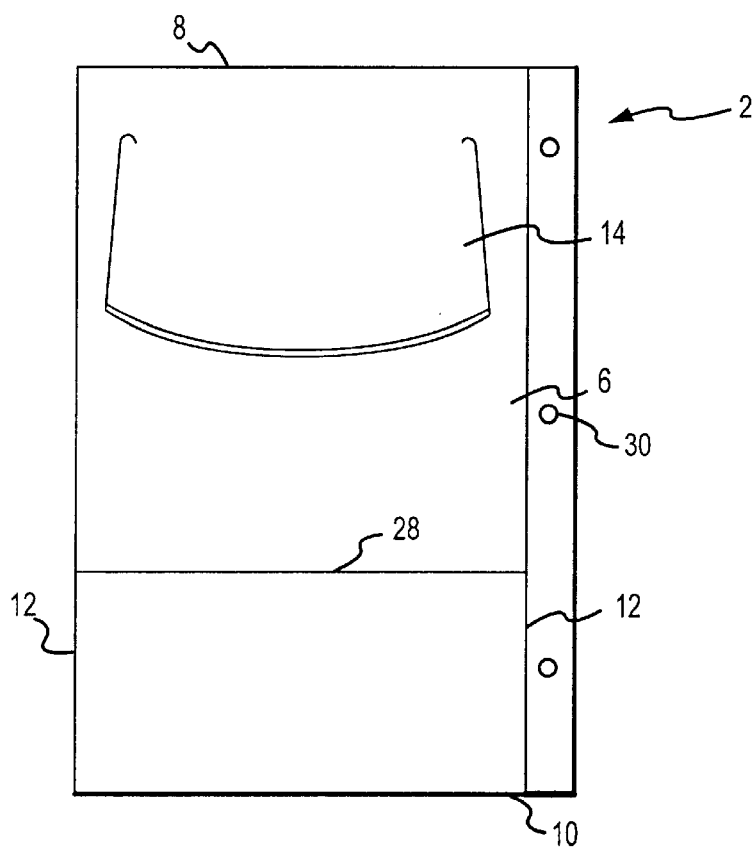
FIG. 19 is a front elevation view of an alternative embodiment of the present invention where the DVD stop seal has the geometric configuration of a straight line.
Figure 20:
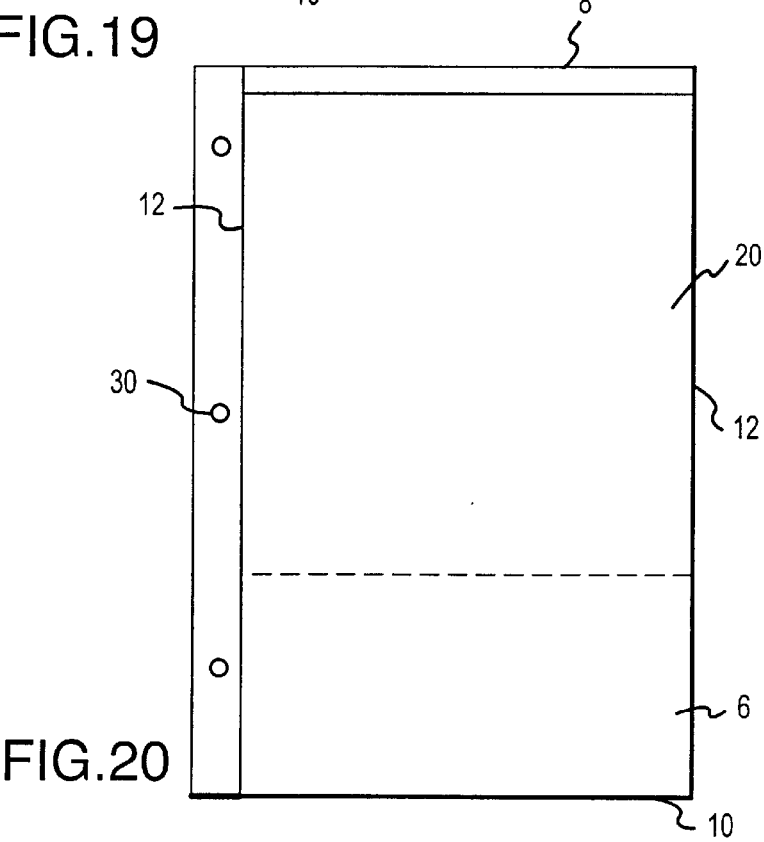
FIG. 20 is a rear perspective view of the embodiment shown in FIG. 19.
Figure 21:
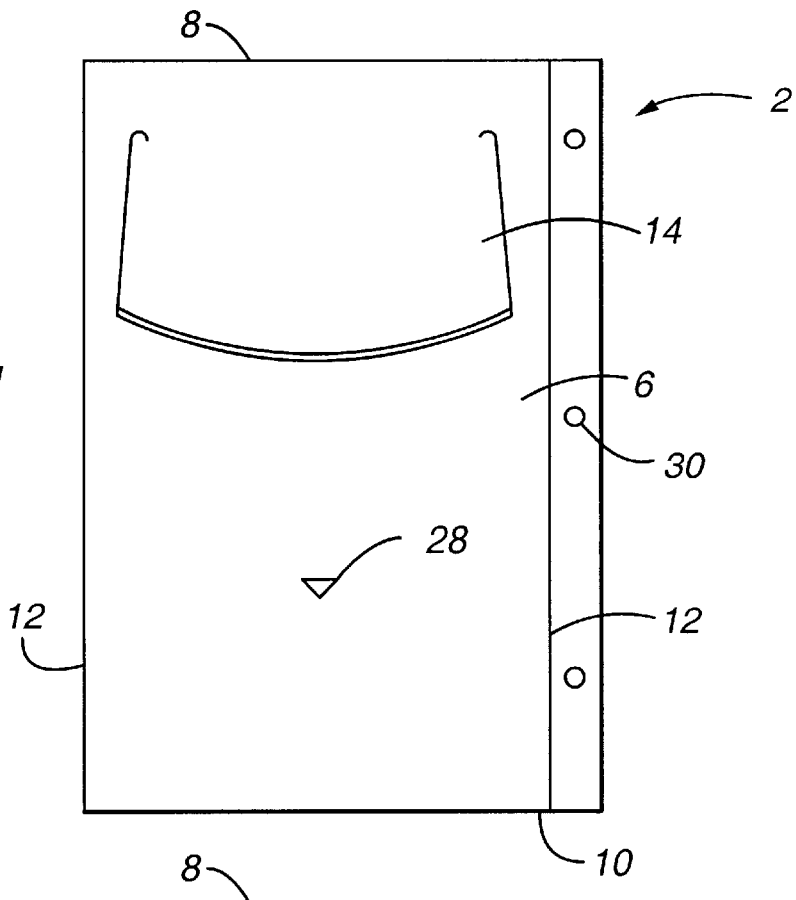
FIG. 21 is a front elevation view of an alternative embodiment of the present invention wherein the DVD stop seal has the geometric configuration of a triangle.
Figure 22:
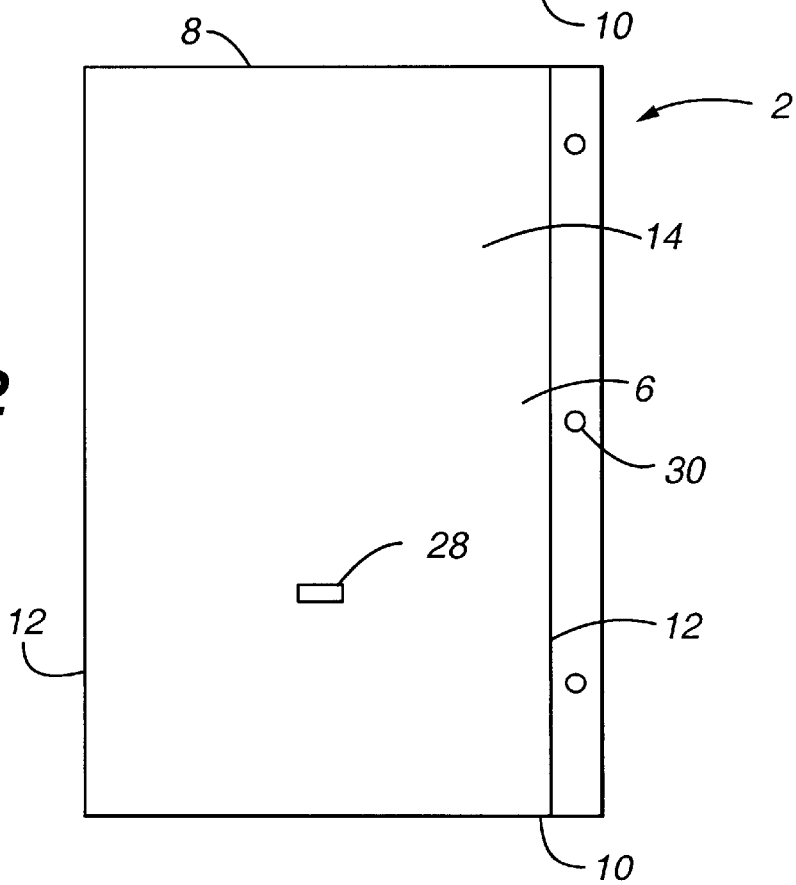
FIG. 22 is a front elevation view of an alternative embodiment of the present invention wherein the DVD stop seal has the geometric configuration of a rectangle.

Referring now to FIGS. 19–20, an alternative embodiment of the present invention is provided herein which depicts one of the DVD stop seal 28 embodiments previously discussed. For example, the DVD stop seal 28 may have any variety of geometric shapes capable of suspending the DVD 4 in an upper portion of the DVD pocket 22. For example, the DVD stop seal can be a straight line, arcuate line, triangular or rectangular shape. In FIG. 19, a front elevation view is provided of one embodiment where the DVD stop seal 28 is a straight line with a flap 14. Alternatively, the flap 14 could be removed and replaced with a "u" shaped thumb cut or other embodiment which allows the DVD 4 to be grasped for removal. FIG. 20 is a rear elevation view of the sleeve shown in FIG. 19, and which further identifies a plurality of binding apertures 30 positioned along a lateral edge 12 of the sleeve 2 to permit the sleeve 2 to be stored in a binding device such as a notebook or DVD wallet.

To assist the reader in the understanding of the present invention, the following list of components and associated numbering found in the drawings are provided hereinbelow:

| Number | Component |
|---|---|
| 2 | Sleeve |
| 4 | Digital Video Disc |
| 6 | Front sheet |
| 8 | Upper edge |
| 10 | Bottom edge |
| 12 | Lateral edge |
| 14 | Flap |
| 16 | Digital video disc front surfaces is middle sheet |
| 18 | Middle sheet |
| 20 | Back sheet |
| 22 | DVD pocket |
| 24 | Graphics pocket |
| 26 | Graphics |
| 28 | DVD Stop Seal |
| 30 | Binding Aperture |
| 32 | Back sheet aperture |
| 34 | Title strip |
| 36 | Frictional Nub |
| 38 | Binding strip |
| 40 | Thumb notch |
| 42 | Thumb cut |
| 44 | DVD aperture |

The foregoing description of the present invention has been presented for purposes of illustration and description. The description is not intended to limit the invention to the form disclosed herein. Consequently, the invention and modifications commensurate with the above teachings and skill and knowledge of the relevant art are within the scope of the present invention. The preferred embodiment described above is also intended to explain the best mode known of practicing the invention and to enable others skilled in the art to utilize the invention in various embodiments and with the various modifications required by their particular applications for use of the invention. It is intended that the claims be construed to include all alternative embodiments as permitted by the prior art.

What is claimed is:

1. A flexible storage apparatus adapted for holding a digital video disc on one side and a graphics page on an opposing side, comprising:
   a front sheet having a top edge, a bottom edge, a left lateral edge and a right lateral edge;
   a transparent back sheet having a top edge, a bottom edge, a left lateral edge and a right lateral edge;
   a middle sheet positioned between said front sheet and said transparent rear sheet and having a top edge, a bottom edge, a left lateral edge and a right lateral edge;
   a first sleeve formed by interconnecting said front sheet and said middle sheet along at least said left lateral edge, said right lateral edge and said bottom edge;
   a stop seal interconnecting said front sheet to said middle sheet to reduce an overall length of said first sleeve and to support the digital video disc positioned in said first sleeve, said stop seal positioned at least about 65% from said top edge toward said bottom edge;
   a second sleeve formed by interconnecting said transparent back sheet and said middle sheet along at least said left lateral edge, said right lateral edge and said bottom edge, said second sleeve adapted for holding the graphics page associated with the digital video disc.

2. The storage apparatus of claim 1, wherein said middle sheet is comprised of a non-woven material.

3. The storage apparatus of claim 2, wherein said non-woven material is comprised of a spun-bonded, continuous polypropylene fiber.

4. The storage apparatus of claim 1, wherein said front sheet is comprised of a non-woven material.

5. The storage sleeve of claim 1, wherein said front sheet is comprised of a transparent material.

6. The storage apparatus of claim 1, wherein said stop seal has an arcuate shape adapted for engaging a portion of an outer circumference of the digital video disc.

7. The sleeve of claim 1, wherein said stop seal is a linear seam extending substantially between said left lateral edge and said right lateral edge.

8. The storage sleeve of claim 1, wherein said front sheet further comprises a flap which at least partially covers an exterior surface of the digital video disc.

9. The storage apparatus of claim 8, wherein said flap has a flap termination point which resists tearing.

10. The storage apparatus of claim 1, wherein said transparent back sheet has a non-linear edge positioned along said top edge to facilitate grasping of the graphics page positioned within said second pocket.

11. The storage apparatus of claim 1, further comprising a spine with at least one aperture positioned along said left lateral edge or said right lateral edge which is adapted for securing said sleeve in a binding device.

12. The storage apparatus of claim 1, wherein said top edge of said front sheet, said transparent back sheet and said middle sheet are operably interconnected.

13. A combination of a recording disc, a graphics page and a flexible page adapted for holding at least one recording disc on a first side, and at least one graphics page associated with the recording disc on an opposing side, comprising:
   a front sheet having a top edge, a bottom edge, a left lateral edge and a right lateral edge;
   a back sheet having a top edge, a bottom edge, a left lateral edge and a right lateral edge;
   a middle sheet having a top edge, a bottom edge, a left lateral edge and a right lateral edge, said middle sheet positioned between said front sheet and said back sheet and operably interconnected to said front sheet and said back sheet along at least said bottom edge, said left lateral edge and said right lateral edge, wherein the at least one graphics page is positioned between said back sheet and said middle sheet;
   a stop weld operably interconnecting said front sheet to said middle sheet between said top edge and said bottom edge, wherein when the at least one recording disc is positioned between said front sheet and said middle sheet and the recording disc is elevated above said bottom edge.

14. The combination of claim 13, wherein said stop seal has a linear shape extending substantially between said left lateral edge and said right lateral edge.

15. The combination of claim 13, wherein said stop seal has a substantially arcuate shape.

16. The combination of claim 13, wherein said middle sheet is comprised of a non-woven material.

17. The combination of claim 13, wherein said back sheet is comprised of a transparent material.

18. The combination of claim 13, wherein said front sheet further comprises a flap to at least partially cover a portion of said at least one recording disc.

19. The combination of claim 13, further comprising a spine with at least one aperture positioned along said left lateral edge or said right lateral edge which is adapted for securing said combination in a binding device.

20. The combination of claim 13, wherein said front sheet is comprised of a transparent material.

21. The combination of a recording disc having a first diameter, a graphics page associated with the recording disc which has a first length greater than said first diameter, and a storage apparatus for holding said recording disc and said graphics page, comprising:

a flexible front sheet having a top edge, a bottom edge and two lateral edges;

a middle sheet having a top edge, a bottom edge and two lateral edges;

a back sheet having a top edge, a bottom edge and two lateral edges, said front sheet, said middle sheet and said back sheet interconnected along at least said bottom edges and said two lateral edges to form a first sleeve for holding said recording disc, and a second sleeve on an opposing side for holding said graphics page; and a disc stopping seal formed by interconnecting said front sheet and said middle sheet at a predetermined location between said top edge and said bottom edge and to support said recording disc, wherein said first sleeve is adapted to hold said recording disc in an elevated position above said bottom edge, and said second sleeve is adapted to hold said graphics page on an opposing side.

22. The combination of claim 21, further comprising a binding strip interconnected to one of said two lateral edges which is adapted for interconnection to a binding device.

23. The combination of claim 21, wherein said middle sheet is a non-woven material.

24. The combination of claim 21, wherein said stop seal has a geometric shape which is at least one of a circle, a linear line, an arcuate line, a triangular shape and a rectangular shape.

25. The combination of claim 21, wherein said flexible front sheet further comprises a flap for covering at least a portion of said recording disc.

26. The combination of claim 21, wherein said back sheet is comprised of a transparent material.

27. The combination of claim 21, wherein said front sheet is comprised of a transparent material.

* * * * *